United States Patent
Mariappan et al.

(10) Patent No.: US 12,159,176 B2
(45) Date of Patent: Dec. 3, 2024

(54) PROTECTING INSTANCES OF RESOURCES OF A CONTAINER ORCHESTRATION PLATFORM FROM UNINTENTIONAL DELETION

(71) Applicant: Juniper Networks, Inc., Sunnyvale, CA (US)

(72) Inventors: Yuvaraja Mariappan, San Jose, CA (US); Thayumanavan Sridhar, Sunnyvale, CA (US); Sajeesh Mathew, Saratoga, CA (US); Raj Yavatkar, Los Gatos, CA (US); Senthilnathan Murugappan, Fremont, CA (US); Raja Kommula, Cupertino, CA (US); Kiran K N, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 273 days.

(21) Appl. No.: 17/491,224

(22) Filed: Sep. 30, 2021

(65) Prior Publication Data
US 2023/0101973 A1 Mar. 30, 2023

(51) Int. Cl.
*G06F 9/54* (2006.01)
*G06F 9/455* (2018.01)

(52) U.S. Cl.
CPC .......... *G06F 9/547* (2013.01); *G06F 9/45558* (2013.01); *G06F 2009/45562* (2013.01)

(58) Field of Classification Search
CPC ................ G06F 9/547; G06F 9/45558; G06F 2009/45562; G06F 9/5022; G06F 9/5072
See application file for complete search history.

(56) References Cited

U.S. PATENT DOCUMENTS

| | | |
|---|---|---|
| 8,650,159 B1 | 2/2014 | Zhang et al. |
| 10,728,145 B2 | 7/2020 | Rao et al. |
| 11,036,675 B1 | 6/2021 | Whitmer et al. |
| 2020/0177475 A1 | 6/2020 | Mishra et al. |
| 2021/0397712 A1* | 12/2021 | Gajananan .............. G06F 21/64 |
| 2023/0214251 A1* | 7/2023 | Jing ...................... G06F 9/5027 718/1 |

OTHER PUBLICATIONS

Kubernetes.io, "Owners and Dependents" (Jul. 8, 2021), pp. 1-2 [retrieved from https://web.archive.org/web/20210814025012/https://kubernetes.io/docs/concepts/overview/working-with-objects/owners-dependents/].*

(Continued)

*Primary Examiner* — Brian W Wathen
(74) *Attorney, Agent, or Firm* — Shumaker & Sieffert, P.A.

(57) ABSTRACT

A container orchestration platform manages a plurality of instances of resources including a first custom resource and a second custom resource. An API server of the container orchestration platform receives a request to delete an instance of the second custom resource; determines whether instance data associated with the instance of the second custom resource has a backreference identifying an instance of the first custom resource, the backreference indicating the instance of the first custom resource is dependent on the instance of the second custom resource; and in response to determining that the instance data has the backreference to the instance of the first custom resource, bypasses deletion of the instance of the second custom resource.

18 Claims, 15 Drawing Sheets

(56) References Cited

OTHER PUBLICATIONS

Kubernetes.io, "Finalizers" (Aug. 6, 2021), pp. 1-2 [retrieved from https://web.archive.org/web/20210813145109/https://kubernetes.io/docs/concepts/overview/working-with-objects/finalizers/].*

Jindal, "kubectl delete should wait for resource to be deleted before returning" (Mar. 6, 2017), pp. 1-11 [retrieved from https://stackoverflow.com/questions/51068026/when-exactly-do-i-set-an-ownerreferences-controller-field-to-true].*

Santos, "Programming a Kubernetes Extension API Server—Part 1" (Sep. 14, 2021) pp. 1-32 [retrieved from https://medium.com/@marcos30004347/programming-a-kubernetes-extension-api-server-part-1-60526e141a10].*

Alpar (Kasten), "Using Finalizers to COntrol Deletion" (May 14, 2021), pp. 1-6 [retrieved from https://kubernetes.io/blog/2021/05/14/using-finalizers-to-control-deletion/].*

Extended Search Report from counterpart European Application No. 22164470.1 dated Sep. 7, 2022, 9 pp.

"Recommended Labels", kubernetes [online]. Retrieved from the Internet: <https://kubernetes.io/docs/concepts/overview/working-with-objects/common-labels/> Last Modified May 6, 2021. 1 pp.

Haider, "9 Best Practices and Examples for Working with Kubernetes Labels", replex [online]. Retrieved from the Internet: <https://www.replex.io/blog/9-best-practices-and-examples-for-working-with-kubernetes-labels> Sep. 28, 2018, 15 pp.

Wouters, "Accidentally deleted a Kubernetes service? Helm Rollback to the Rescue" Kuori [online]. Retrieved from the Internet: <https://www.kuori.io/post/accidentally-deleted-a-kubernetes-service-helm-rollback-to-the-rescue> Jul. 17, 2019, 5 pp.

Cade, "6 Best Practices for Kubernetes Backup", Kasten K10 Blog [online]. Retrieved from the Internet: <https://blog.kasten.io/6-best-practices-for-kubernetes-backup> Jun. 2019, 5 pp.

"Labels and Selectors", kubernetes [online]. Retrieved from the Internet: <https://kubernetes.io/docs/concepts/overview/working-with-objects/labels/> Last Modified Jul. 1, 2021. 5 pp.

Response to Extended Search Report dated Sep. 7, 2022, from counterpart European Application No. 22164470.1 filed Oct. 4, 2023, 9 pp.

* cited by examiner

```
apiVersion: core.jesp.juniper.net/v1alpha1
kind: JespNode
metadata:
  annotations:
    core.jesp.juniper.net/decription: Jesp Node represents an Juniper Edge Node in
      JESP. JespPort in JespNode represents interface in Juniper Edge Node.
    core.jesp.juniper.net/display-name: Sample Jesp Node
  creationTimestamp: "2021-07-13T00:53:16Z"
  finalizers:
  - jespnode.finalizers.core.jesp.juniper.net
  generation: 1
  labels:
    reference.core.jesp.juniper.net/1a030faedfb1c17fb4832c6305d4295294457300977ee4080cf78405: VirtualInterface_jesp_jespnode-example-ovsbr1
    reference.core.jesp.juniper.net/9fb92a2290e95488dad831d912260a2fbf24907aad1907dc870ae525: VirttualNetwork_jesp_virtualnetwork-example
    reference.core.jesp.juniper.net/a1dc74cab23281868e437256545aa4b74e501629cfa5b7ff3689ee0: InstanceIP_jesp_jespnode-example-ovsbr1-iip
  managedFields:
  - apiVersion: core.jesp.juniper.net/v1alpha1
    fieldsType: FieldsV1
    fieldsV1:
      f:metadata:
        f:annotations:
          .: {}
          f:core.jesp.juniper.net/description: {}
          f:core.jesp.juniper.net/display-name: {}
      f:spec:
        f:jespPort:
          f:ipv4Address: {}
          f:macAddress: {}
          f:name: {}
          f:virtualNetworkReference:
            .: {}
            f:apiVersion: {}
```

```
apiVersion: core.jesp.juniper.net/v1alpha1
kind: VirtualInterface
metadata:
  creationTimestamp: "2021-07-13T00:53:16Z"
  finalizers:
  - virtualinterface.finalizers.core.jesp.juniper.net
  generation: 1
  labels:
    back-reference.core.jesp.juniper.net/a1dc74cab2328f8686e4372565458aa4b74e501629cfa5b7ff3689ee0: InstanceIP_jesp_jespnode-example-ovsbr1-iip    ⎫ 612
    back-reference.core.jesp.juniper.net/fe2fcadfc2637a24066917691d96d757b3444a7c825fca44567d57440: JespNode-jespnode-example                      ⎬ 614
    reference.core.jesp.juniper.net/9fb92a2290e95488dad831d912260a2fbf24907aad1907dc870ae525: VirtualNetwork_jesp_virtualnetwork-example           ⎭
  managedFields:
  - apiVersion: core.jesp.juniper.net/v1alpha1
    fieldsType: FieldsV1
    fieldsV1:
      f:metadata:
        f:finalizers:
          .: {}
          v:"virtualinterface.finalizers.core.jesp.juniper.net": {}
        f:labels:
          .: {}
          f:back-reference.core.jesp.juniper.net/a1dc74cab2328f8686e4372565458aa4b74e501623cfa5b7ff3689ee0: {}
          f:back-reference.core.jesp.juniper.net/fe2fcadfc2637a24066917691d96d757b3444a7c825fca44567d57440: {}
        f:ownerReferences:
          .: {}
          k:{"uid":"827a8af2-43df-4efb-b6b9-4b2d619d1001"}
            .: {}
            f:apiVersion: {}
            f:blockOwnerDeletion: {}
            f:controller: {}
            f:kind: {}
            f:name: {}
"~/vif.yaml" 82L, 2567C
```

FIG. 6B

```
apiVersion: core.jesp.juniper.net/v1alpha1
kind: InstanceIP
metadata:
  creationTimestamp: "2021-07-13T00:53:16Z"
  finalizers:
  - instanceip-ipaddress.finalizers.core.jesp.juniper.net
  generation: 2
  labels:
    back-reference.core.jesp.juniper.net/fe2fcadfc2637a2406691769d96d757b3444a7c825fca44567d57440: Jespnode_jespnode-example
    reference.core.jesp.juniper.net/1a030faedfb1c17fb4832c6305d4294457300977ee4080cf78405: VirtualInterface_jesp_jespnode-example-ovsbr1
    reference.core.jesp.juniper.net/9fb92a2290e95488dad831d912260a2fbf24907aad1907dc870ae525: VirtualNetwork_jesp_virtualnetwork-example
  managedFields:
  - apiVersion: core.jesp.juniper.net/v1alpha1
    fieldsType: FieldsV1
    fieldsV1:
      f:metadata:
        f:finalizers:
          .: {}
          v:"instanceip-ipaddress.finalizers.core.jesp.juniper.net": {}
        f:labels:
          .: {}
          f:back-reference.core.jesp.juniper.net/fe2fcadfc2637a2406691769d96d757b3444a7c825fca44567d57440: {}
          f:reference.core.jesp.juniper.net/ef738fe9ec3704d1afe4bd133499c27e58b0384056e602ead395989a: {}
        f:ownerReferences:
          .: {}
          k:{"uid":"827a8af2-43df-4efb-b6b9-4b2d619d1001"}
            .: {}
            f:apiVersion: {}
            f:blockOwnerDeletion: {}
            f:controller: {}
            f:kind: {}
            f:name: {}
"~/ip.yaml" 110L, 3239C
```

```
apiVersion: core.jesp.juniper.net/v1alpha1
kind: VirtualNetwork
metadata:
  annotations:
    core.jesp.juniper.net/description: VirtualNetwork is a collection of end points
      (interface or ip(s) or MAC(s)) that can communicaticate with each other by default.
      It is a collection of subnets whose default gateways are connected by an implicit
      router
    core.jesp.juniper.net/display-name: Sample Virtual Network
  creationTimestamp: "2021-07-13T00:53:09Z"
  finalizers:
  - virtualnetwork-id.finalizers.core.jesp.juniper.net
  generation: 1
  labels:
    back-reference.core.jesp.juniper.net/1a030faedfb1c17fb4832c6305d4429529a4457300977ee4080cf78405: VirtualInterface_jesp_jespnode-example-ovsbr1
    back-reference.core.jesp.juniper.net/a1dc74cab2328f866e4372565458aa4b74e501629cfa5b7ff3689ee0: InstanceIP_jesp_jespnode-example-ovsbr1-iip
    reference.core.jesp.juniper.net/ef738fe9ec3704d1afe4bd133499c27e58b038405e602ead395989a: Subnet_jesp_subnet-example
  managedFields:
  - apiVersion: core.jesp.juniper.net/v1alpha1
    fieldsType: FieldsV1
    fieldsV1:
      f:metadata:
        f:annotations:
          .: {}
          f:core.jesp.juniper.net/description: {}
          f:core.jesp.juniper.net/display-name: {}
      f:spec:
        f:v4SubnetReference:
          .: {}
          f:apiVersion: {}
          f:kind: {}
          f:name: {}
"~/vn.yaml" 76L, 2589C
```

FIG. 6D

```
[root@5a9s9-node2 sample]# kubectl get jesp -n jesp
NAME                                                      IPADDRESS       VIRUTALINTERFACE              NETWORK                     STATE    AGE
instanceip.core.jesp.juniper.net/jespnode-example-ovsbr1-iip  192.168.1.100  jesp/jespnode-example-ovsbr1  jesp/virtualnetwork-example  Success  3m54s NAME                                                      MACADDRESS          VIRTUALINTERFACE              IPADRESS        INSTANCEIP                         NETWORK
jespnode.core.jesp.juniper.net/jespnode-example           00:11:22:33:44:67   jesp/jespnode-example-ovsbr1  192.168.1.100   jesp/jespnode-example-ovsbr1-iip   jesp/v
irtualnetwork-example     Success     3m55s NAME                                                      CIDR             GATEWAY        USAGE    STATE    AGE
subnet.core.jesp.juniper.net/subnet-example               192.168.1.0/24   192.168.1.1    1.56%    Success  7d16h NAME                                                      STATE    AGE
usercredential.core.jesp.juniper.net/usercredential-example  Success  3d14h NAME                                                      MACADDRESS          NETWORK                       STATE    AGE
virtualinterface.core.jesp.juniper.net/jespnode-example-ovsbr1   00:11:22:33:44:67   jesp/virtualnetwork-example  Success  3m54s NAME                                                      VNI   V4SUBNET              V6SUBNET   STATE    AGE
virtualnetwork.core.jesp.juniper.net/virtualnetwork-example  1   jesp/subnet-example   n/a        Success  7d16h

[root@5a9s9-node2 sample]# kubectl delete virtualinterface.core.jesp.juniper.net/jespnode-example-ovsbr1 -n jesp
Error from server (Forbidden): virtualinterfaces.core.jesp.juniper.net "jespnode-example-ovsbr1" is forbidden: back-reference(s) are present

[root@5a9s9-node2 sample]#
```

FIG. 6E

```
apiVersion: core.jesp.juniper.net/v1alpha1
kind: JespNode
metadata:
 name: jespnode-example
 annotations:
   core.jesp.juniper.net/display-name: Sample Jesp Node
   core.jesp.juniper.net/description:
     Jesp Node represents the smartnic as the Juniper Edge Node in JESP.
     mgmtPort in JespNode represents managment interface in Juniper Edge Node.
spec:
 mgmtPort:
   # name and ipv4Address can be skipped
   name: ovsbr1
   macAddress:
   ipv4Address:
   virtualNetworkReference:
     apiVersion: core.jesp.juniper.net/v1alpha1
     kind: VirtualNetwork
     namespace: jesp
     name: virtualnetwork-example
 nodeCredential:
   # userName and password should be base64 encoded
   userName:
   password:
```

FIG. 8

PROTECTING INSTANCES OF RESOURCES OF A CONTAINER ORCHESTRATION PLATFORM FROM UNINTENTIONAL DELETION

TECHNICAL FIELD

This disclosure relates to computing systems, and more specifically to container orchestration platforms.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities. Various instances of data objects may be used to describe and configure the equipment, services, and other resources of a cloud data center network.

SUMMARY

In general, the disclosure describes techniques for preventing the unintentional or erroneous deletion of instances of Kubernetes custom resources. Kubernetes is a container orchestration platform for automating, scaling, and managing containerized applications. A custom resource can be used to extend a Kubernetes platform by allowing a user to define an application program interface (API) that may not be available in a default installation of the Kubernetes platform. A custom resource is an object that includes data and/or methods that describe the custom resource and defines an API for creating and manipulating the data. In the example of an SDN, custom resources may describe physical infrastructure, virtual infrastructure, configurations, and other resources of the SDN. As part of the configuration and operation of an SDN, various custom resources may be instantiated. As an example, an edge node may utilize a virtual network for routing, and may utilize a virtual interface having a Media Access Control (MAC) address for communication over the virtual network. Further, the edge node may be assigned an Internet Protocol (IP) address. Thus, an edge node can be said to be dependent on virtual network, virtual interface, and IP address resources. A developer can define custom resources representing the edge node, the virtual network, the virtual interface, and the IP address that extend the Kubernetes platform beyond the default Kubernetes resources. When a request to create an instance of the edge node is received by an API server of an orchestrator of the SDN, the orchestrator can deploy an instance of the edge node, where the edge node has been defined a custom resource. The instance data can include values that describe the custom resource. Additionally, a reconciler for the edge node custom resource can determine resources on which the edge node is dependent, and the reconciler may create an instance of a custom resource for each such dependency. The instance data for each of the custom resources will vary depending on the type of custom resource. In the example above, the reconciler can create an instance of a virtual interface custom resource, an instance of a virtual network custom resource, and an instance of an IP address custom resource. Once the edge node and the resources depended on by the edge node are created, the edge node can operate as an edge node for a computing cluster.

When the edge node is no longer needed or present in the cluster, the edge node can be deleted. In this case, the instance of the edge node custom resource can be deleted. Further, instances of the custom resources used by the edge node custom resource (e.g., the instance of the virtual interface custom resource, the instance of the virtual network custom resource, and the instance of the IP address custom resource) can also be deleted.

In some cases, an administrator or program may erroneously or unintentionally request deletion of a custom resource that is still in use by another custom resource. Deletion of a custom resource when it is still in use by another resource can cause disruption and/or erroneous operation of a system relying on the custom resource. Using the example provided above, deletion of a virtual network custom resource can cause the edge node to fail, resulting in disruption within the cluster. Current Kubernetes platforms do not detect nor prevent such erroneous or unintentional deletion of custom resources.

The disclosure describes techniques for preventing the unintentional or erroneous deletion of dependent instances of Kubernetes custom resources. In some aspects, when a system implementing the techniques disclosed herein creates a first custom resource that depends on another, second custom resource, the system adds a label (referred to as a "reference label") to the instance data of the first custom resource that indicates the dependency on the second custom resource. Additionally, the system adds a label (referred to as a "backreference label") to the instance data of the second custom resource identifying the first custom resource as being dependent on the second custom resource. If the system receives a request to delete a custom resource, the system checks the instance data for the custom resource to determine if a backreference label is present in the instance data. If the backreference label is present in the instance data, the system can prevent the custom resource from being deleted. The system may log the erroneous attempt to delete the custom resource or otherwise indicate to an administrator that such an attempt was made.

The techniques disclosed herein may be included in a practical application that provides technical advantages over existing systems. For example, as noted above, existing Kubernetes-based systems do not provide any protection against the unintentional and/or erroneous deletion of an instance of a custom resource that is depended upon by another instance of a custom resource. If such an unintentional or erroneous deletion occurs, the system may be disrupted or fail to operate correctly. A technical advantage of the techniques disclosed herein is that such erroneous or unintentional deletion of an instance of a custom resource that is depended upon by another custom resource is prevented. Using the example above, if an attempt is made to delete an instance of a virtual network custom resource that is depended upon by an instance of an edge node resource, the container orchestration platform can prevent the deletion and normal operation of an orchestrated cluster can continue uninterrupted. Thus, the techniques disclosed herein can be an improvement over existing systems by reducing the errors and disruption in the operation of a system.

In one example, a method includes receiving, by an API server of a container orchestration platform managing a plurality of instances of custom resources including a first custom resource and a second custom resource, a request to delete an instance of the second custom resource; determining, by the API server, whether instance data associated with the instance of the second custom resource has a backreference identifying an instance of the first custom resource, the backreference indicating the instance of the first custom resource is dependent on the instance of the second custom resource; and in response to determining that the instance data has the backreference to the instance of the first custom resource, bypassing deletion of the instance of the second custom resource.

In another example, a container orchestration system configured to manage a plurality of instances of resources, including a first custom resource and a second custom resource, includes an API server comprising processing circuitry configured to: receive a request to delete an instance of the second custom resource; determine whether instance data associated with the instance of the second custom resource has a backreference identifying an instance of the first custom resource, the backreference indicating the instance of the first custom resource is dependent on the instance of the second custom resource; and in response to a determination that the instance data has the backreference to the instance of the first custom resource, bypassing deletion of the instance of the second custom resource.

In another example, a computer-readable storage medium includes instructions stored thereon that cause one or more processors of a container orchestration platform managing a plurality of instances of resources including a first custom resource and a second custom resource to perform operations including receive a request to delete an instance of the second custom resource; determine whether instance data associated with the instance of the second custom resource has a backreference identifying an instance of the first custom resource, the backreference indicating the instance of the first custom resource is dependent on the instance of the second custom resource; and in response to a determination that the instance data has the backreference to the instance of the first custom resource, bypass deletion of the instance of the second custom resource.

The details of one or more examples are set forth in the accompanying drawings and the description below. Other features, objects, and advantages will be apparent from the description and drawings, and from the claims.

BRIEF DESCRIPTION OF THE DRAWINGS

FIGS. 6A-6E are example screen images showing various user interfaces related to the techniques described herein.

FIG. 8 is an example of a software specification defining a custom resource in accordance with one or more aspects of the present disclosure.

DETAILED DESCRIPTION

Figure 1:
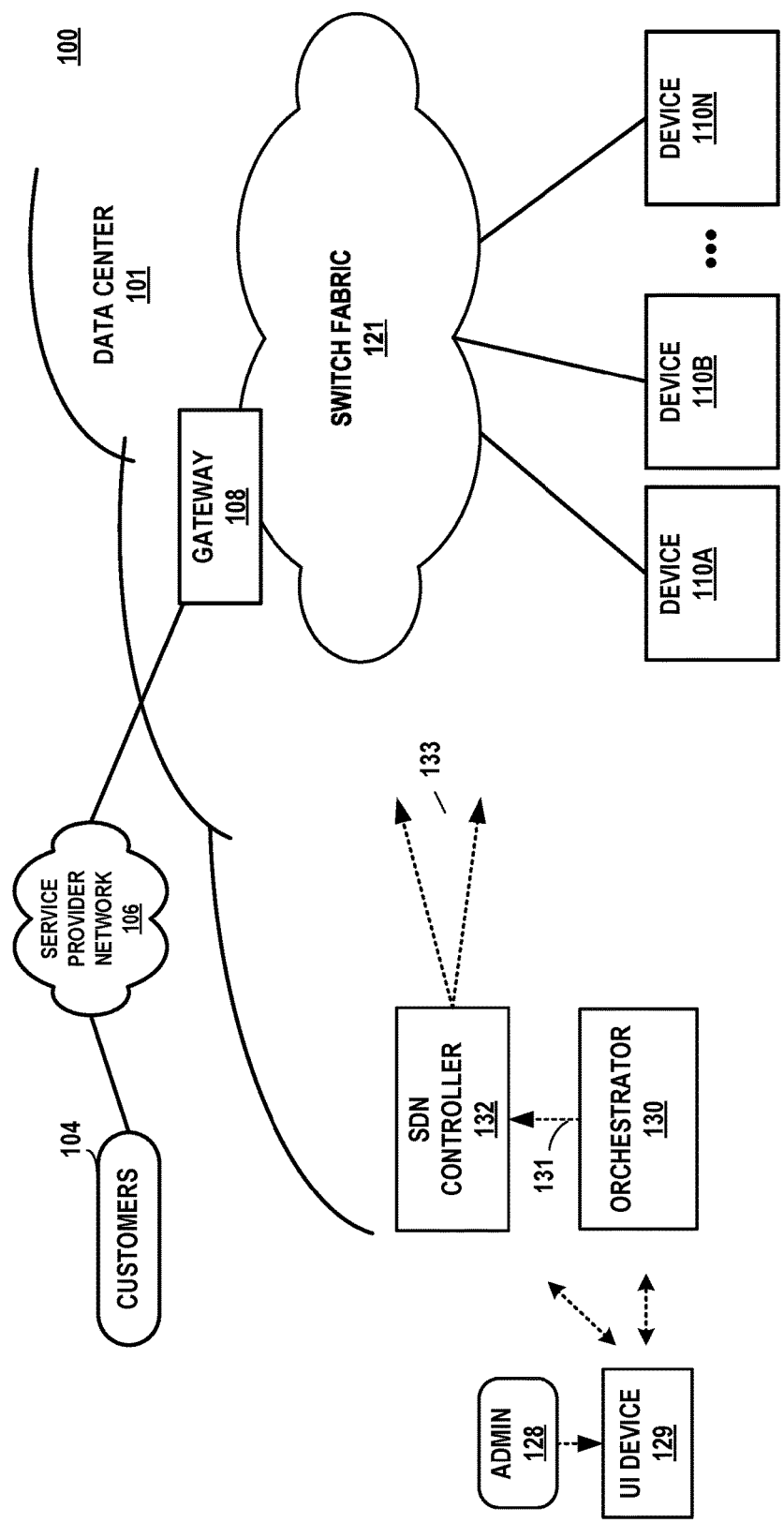
FIG. 1 is a block diagram illustrating an example network in accordance with one or more aspects of the present disclosure.

FIG. 1 is a conceptual diagram illustrating an example network that includes a controller that prevents unintentional or erroneous deletion of custom resources in accordance with one or more aspects of the present disclosure. FIG. 1 illustrates one example implementation of a network system 100 and a data center 101 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks, and the like. Other implementations of network system 100 and data center 101 may be appropriate in other instances. Such implementations may include a subset of the components included in the example of FIG. 1 and/or may include additional components not shown in FIG. 1.

In the example of FIG. 1, data center 101 provides an operating environment for applications and services for customers 104 coupled to data center 101 by service provider network 106. Although functions and operations described in connection with network system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1, data center 101 is a facility that provides network services for customers 104. Customers 104 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 101 is an individual network server, a network peer, or otherwise.

In the example of FIG. 1, data center 101 includes a set of storage systems, application servers, compute nodes, or other devices, including network device 110A through network device 110N (collectively "network devices 110," representing any number of network devices). Devices 110 may be interconnected via high-speed switch fabric 121 provided by one or more tiers of physical network switches and routers. In some examples, devices 110 may be included within fabric 121, but are shown separately for ease of illustration.

Network devices 110 may be any of a number of different types of network devices (core switches, spine network devices, leaf network devices, edge network devices, or other network devices), but in some examples, one or more devices 110 may serve as physical compute nodes of the data center. For example, one or more of devices 110 may provide an operating environment for execution of one or more customer-specific applications or services. Alternatively, or in addition, one or more of devices 110 may provide an operating environment for one or more virtual machines or other virtualized instances, such as containers. In some examples, one or more of devices 110 may be alternatively referred to as a host computing device or, more simply, as a host. A network device 110 may thereby execute one or more virtualized instances, such as virtual machines, containers, or other virtual execution environment for running one or more services, such as virtualized network functions (VNFs).

In general, each of network devices 110 may be any type of device that may operate on a network and which may generate data (e.g., connectivity data, flow data, sFlow data) accessible through telemetry or otherwise, which may include any type of computing device, sensor, camera, node, surveillance device, or other device. Further, some or all of network devices 110 may represent a component of another device, where such a component may generate data collectible through telemetry or otherwise. For example, some or all of network devices 110 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 101 in accordance with one or more examples of this disclosure. In some examples, SDN controller 132 operates in response to configuration input received from orchestrator 130 via northbound application programming interface (API) 131, which in turn may operate in response to configuration input received from an administrator 128 interacting with and/or operating user interface device 129. In some aspects, orchestrator 130 may be a Kubernetes platform. A Kubernetes platform is a container orchestration platform that can be used to deploy, manage, and scale applications that are packaged as "containers." Kubernetes is available from the Cloud Native Computing Foundation of San Francisco, California. Further description of an orchestration platform and network controller (or SDN controller) are found in U.S. Pat. No. 10,728,145, issued Jul. 28, 2020, which is incorporated by reference herein in its entirety.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 132. In such examples, user interface device 129 may communicate with controller 132 over a network or other means of communication. In other examples, user interface device 129 may be a local peripheral of controller 132, or may be integrated into controller 132.

In some examples, orchestrator 130 manages functions of data center 101 such as compute, storage, networking, and application resources. For example, orchestrator 130 may create a virtual network for a tenant within data center 101 or across data centers. Orchestrator 130 may attach virtual machines (VMs) to a tenant's virtual network. Orchestrator 130 may connect a tenant's virtual network to an external network, e.g., the Internet or a VPN. Orchestrator 130 may implement a security policy across a group of VMs or to the boundary of a tenant's network. Orchestrator 130 may deploy a network service (e.g., a load balancer) in a tenant's virtual network.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestrator 130. For example, SDN controller 132 may implement high-level requests from orchestrator 130 by configuring physical switches, e.g., top-of-rack (TOR) switches, chassis switches, and switch fabric 121; physical routers; physical service nodes such as firewalls and load balancers; and virtual services such as virtual firewalls in a VM. SDN controller 132 maintains routing, networking, and configuration information within a state database.

Figure 2:
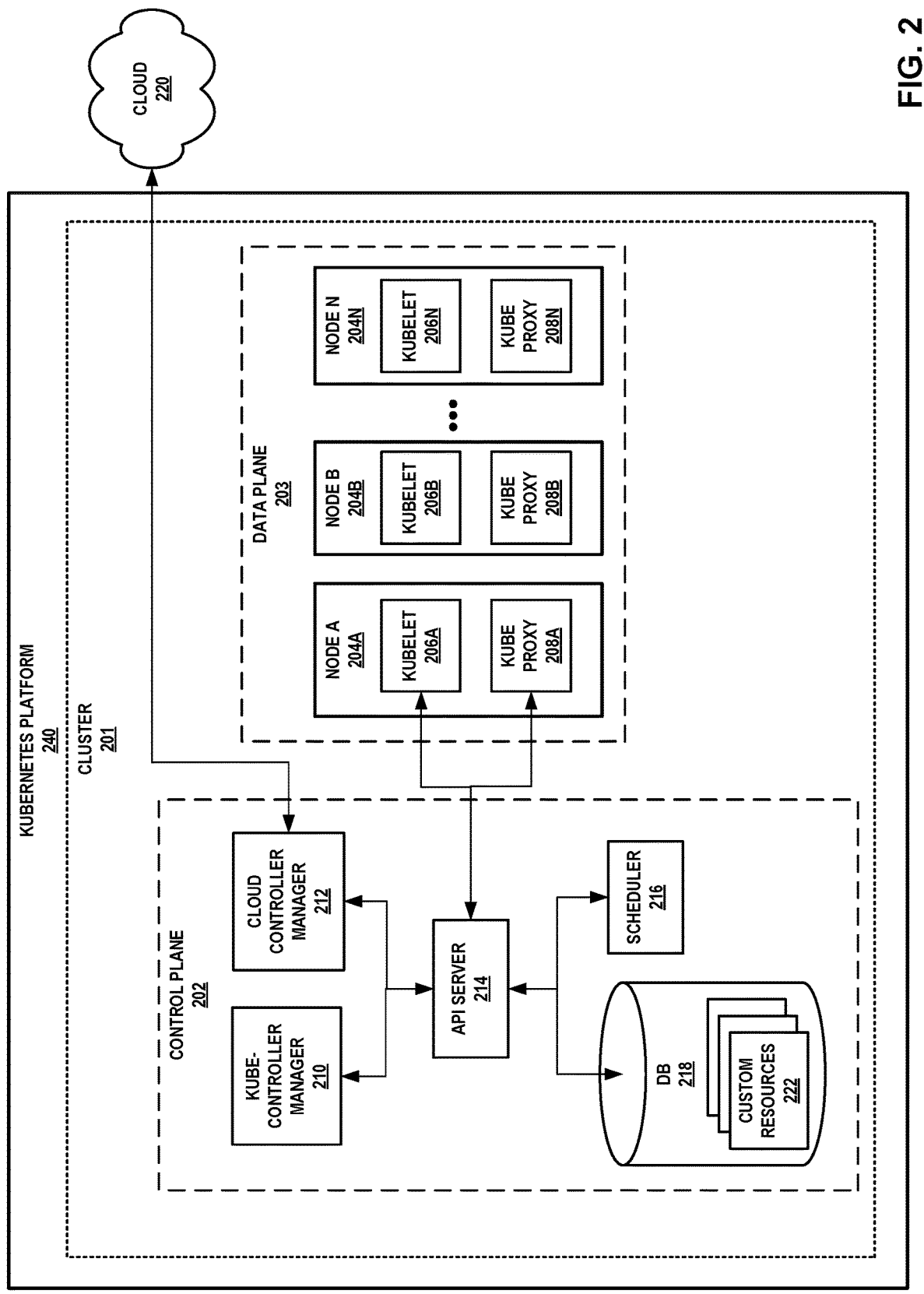
FIG. 2 is a block diagram illustrating aspects of a Kubernetes platform in accordance with one or more aspects of the present disclosure.

FIG. 2 is a block diagram illustrating aspects of a control plane and a data plane of a Kubernetes platform in accordance with one or more aspects of the present disclosure. In some aspects, control plane 202 includes kube-controller manager 210, cloud controller manager 212, API server 214, scheduler 216, and database 218. Control plane 202 may manage nodes 204A-204N in data plane 203. In some aspects, nodes 204A-204N are Kubernetes nodes.

Kube-controller manager 210 manages controller processes of various components of the Kubernetes platform. A controller process is a process that monitors the state of nodes 204 in cluster 201. In some aspects, a controller process is a control loop that monitors a current state of cluster 201 and, if necessary, perform actions to change the current state of cluster 201 to a desired state. Various controller processes may exist and may monitor different aspects of cluster 201. In some aspects, custom resources 222 may each have an associated custom controller. In these aspects, the custom controller may include a control loop that monitors the state of the custom resource and, if necessary, performs actions to change to the current state of the custom resource to a desired state.

Cloud controller manager 212, when present, provides an interface to a cloud 220 of a cloud service provider. Cloud controller manager 212 can include cloud-specific control logic that can link Kubernetes platform 240 and nodes 204 to cloud 220. Cloud 220 can be a private cloud or a public cloud.

API server 214 exposes an API for interaction with and within Kubernetes platform 240. API server can receive requests from end users, nodes 204, and external components. Such requests can include requests to query and change the state of objects within the system, requests for communication between objects, requests to add or delete resources etc.

Scheduler 216 manages scheduling of execution units referred to as pods on nodes 204. A Kubernetes pod can include one or more containers, where each container is a self-contained application, including any libraries and configuration settings needed to run the application. Scheduler 216 can select one of nodes 204 to receive a pod and to run any of the applications in containers of the pod.

Database 218 can store configuration data, state data, metadata, and other data associated with the configuration and operation of a Kubernetes cluster. In some aspects, database 218 can be a Kubernetes etcd database. In some aspects, database 218 can store custom resource definitions 222. As discussed above, a custom resource can be used to extend Kubernetes platform 240 with data and APIs that may not be available in a default installation of Kubernetes platform 240. A custom resource can include data that describes the custom resource. Additionally, a custom resource may include define an API for creating and manipulating the data associated with a custom resource.

Figure 5A:
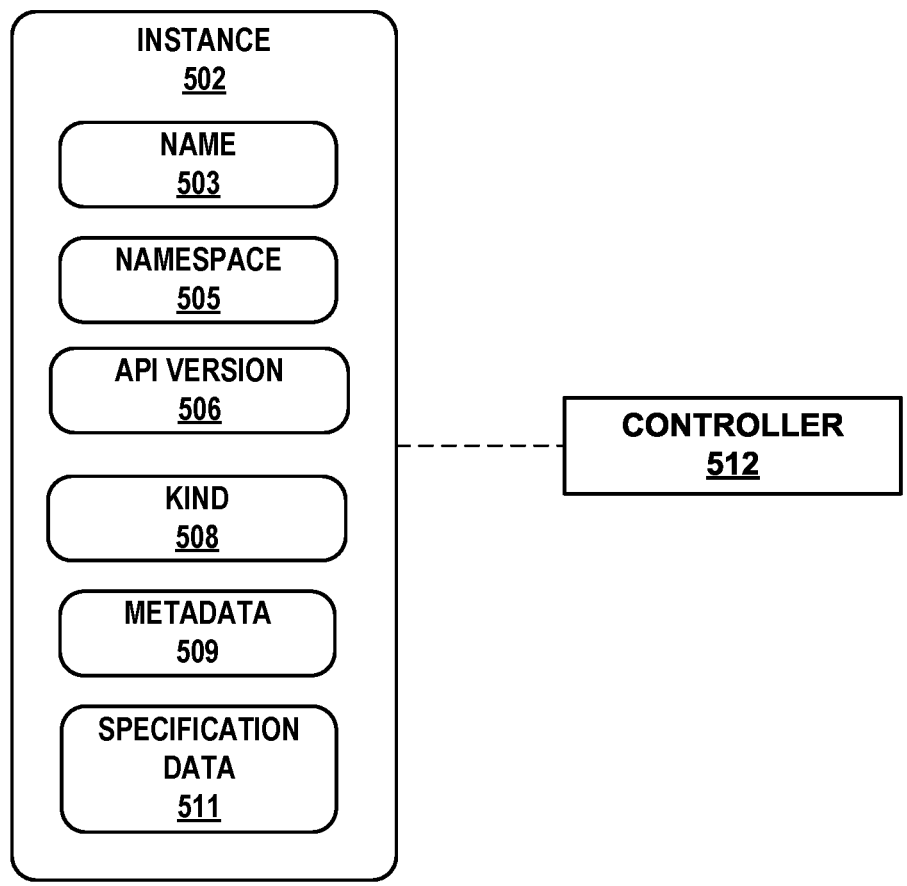
FIGS. 5A and 5B are conceptual diagrams illustrating instance data describing custom resources according to one or more aspects of the present disclosure.

FIG. 5A is a conceptual diagram illustrating instance data describing instances of custom resources according to one or more aspects of the present disclosure. In some aspects, an instance 502 of a custom resource has instance data that can include name 503, API version 506, kind 508, metadata 509, and specification data 511. Name 503 is a name for the custom resource. Namespace 505 identifies a namespace for name 503. Namespace 505 provide a scope for names such as name 502. Names of custom resources need to be unique within a namespace, but are not necessarily unique across namespaces. As an example, namespaces can be used to divide cluster resources across multiple users.

API version 506 identifies a version of the API used to create an instance of the custom resource. In some aspects, versioning is done at the API level instead of the resource or field level. This can facilitate ensuring that the API presents a consistent view of system resources, custom resources, and their behavior.

Kind 508 identifies the kind (i.e., type) of resource. For example, in an SDN, one kind of resource may be an edge node, other kinds of resources may include a virtual network, a virtual interface, an IP address, etc.

Metadata 509 can include data that describes data about the custom resource. For example, metadata 509 can include the display name of the resource and a short description of the resource. In some aspects, name 502 and namespace 505 may be included in metadata 509.

Specification data 511 includes data that describes a state of the custom resource. In some aspects, specification data 511 may represent the current state of the custom resource or a desired state of the custom resource.

Instance 502 may have an associated custom controller 512. Custom controller 512 may implement logic that includes a control loop that monitors instances of a custom resource and perform actions that change the state of a custom resource from a current state to a desired state.

FIG. 8 is an example of a software specification defining a custom resource in accordance with one or more aspects of the present disclosure. The example specification is a YAML ain't markup language (YAML) specification for a custom resource referred to as a "JespNode," which may be an edge node in an SDN. The example specification includes a metadata section (e.g., metadata 509) that identifies the name of the custom resource ("jespnode-example") and an annotation describing the custom resource. A specification section starting with "spec:" includes fields that define the custom resource.

Returning to FIG. 2, nodes 204 can host applications such as applications provided in containers. Such applications may operate on or with custom resources 222. Scheduler 216 can schedule a pod having one or more containers on one or more of nodes 204. A node can be a physical machines such as a server, or it can be a virtual machine. Nodes 204A-204N can include kubelets 206A-206N (referred to generically "kubelet 206") and kube proxies 208A-208N (referred to generically as "kube proxy 208") respectively. Kubelet 206 is an agent that runs on each of nodes 204 in cluster 201. Kubelet 206 monitors the state of containers that are running on its corresponding node.

Kube-proxy 208 is a network proxy that executes on each node in cluster 201. Kube-proxy 208 provides services as defined in the Kubernetes API on each node and can perform TCP, UDP, and SCTP forwarding.

In the example shown in FIG. 2, the components of Kubernetes platform 240 are shown as being separate from cloud 220. For example, the components may be implemented in a datacenter (e.g., a public, private, or enterprise data center) or may be local to an enterprise. In some aspects, some or all of the components may be implemented in cloud 220. For example, some or all of nodes 204 may be implemented on servers in cloud 220.

Creation of an instance of a custom resource 222 defined in database 218 can begin with API server 214 receiving a request to create a custom resource. As noted above, in some aspects, a custom controller can control provisioning and management of custom resources in Kubernetes. In some aspects, a custom controller registers with kube-controller manager 210 (FIG. 2).

Figure 3:
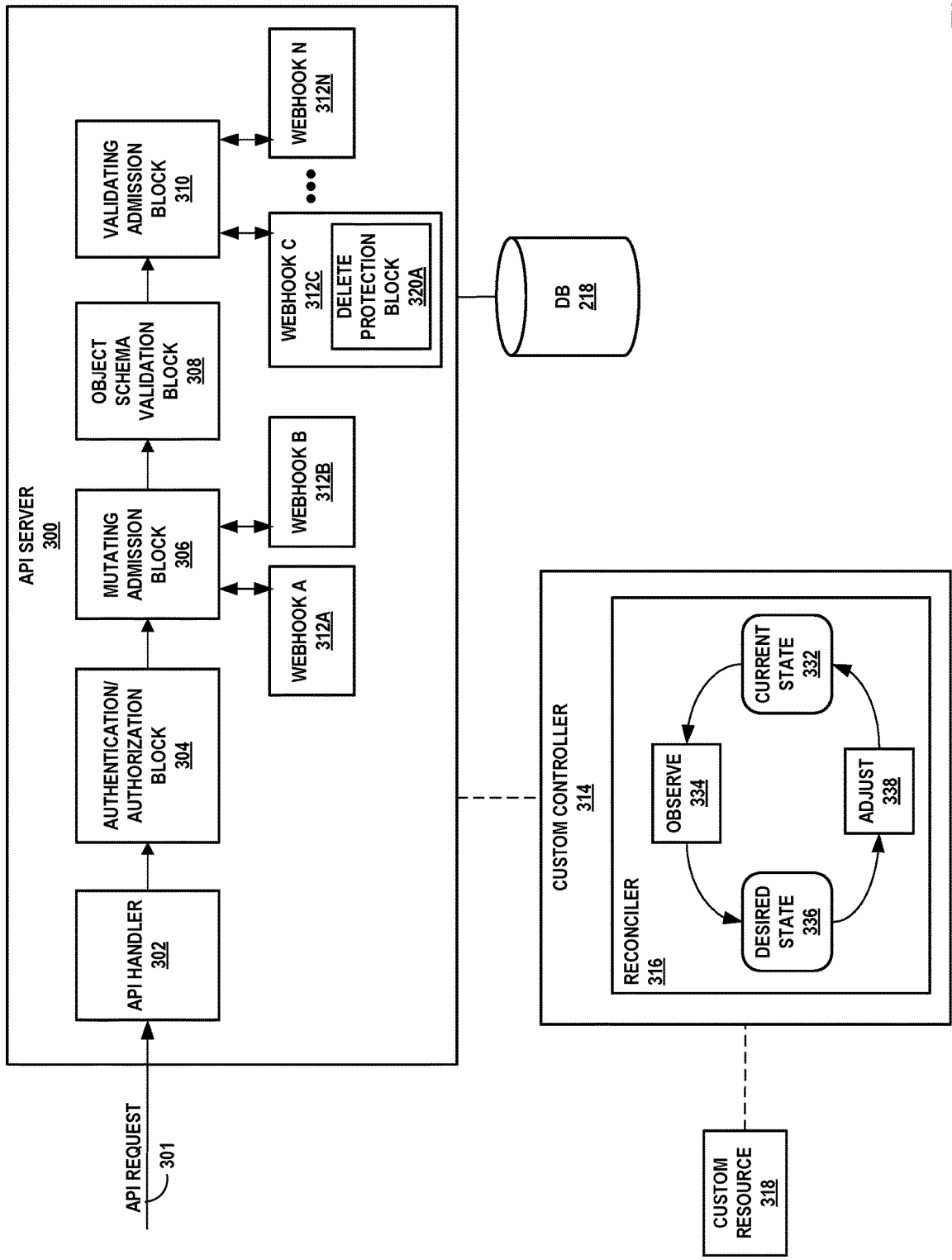
FIG. 3 is a block diagram illustrating an API server using webhooks to protect a custom resource from unintentional or erroneous deletion in accordance with one or more aspects of the present disclosure.
Figure 4:
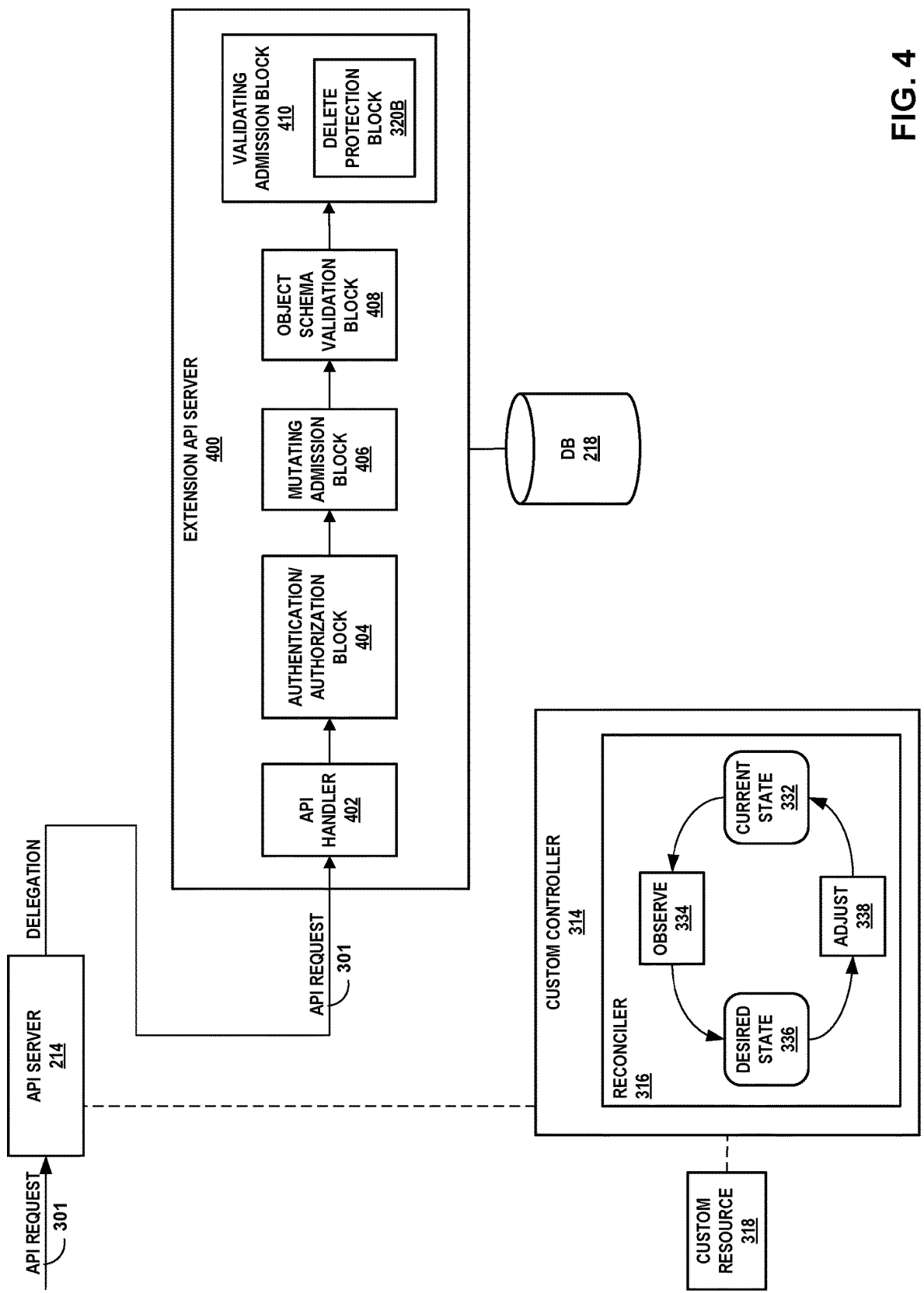
FIG. 4 is a block diagram illustrating an extension API server in accordance with one or more aspects of the present disclosure.

FIGS. 3 and 4 are block diagrams illustrating a custom controller and API servers that that are configured to protect custom resources from unintentional or erroneous deletion according to techniques disclosed herein. In the examples illustrated in FIGS. 3 and 4, custom controller 314 can associated with custom resource 318. Custom resource 318 can be any of custom resources 222 (FIG. 2). Custom controller 314 can include reconciler 316 that includes logic to execute a reconciliation loop in which custom controller 314 observes 334 (e.g., monitors) a current state 332 of custom resource 318. In response to determining that a desired state 336 does not match a current state 332, reconciler 316 can perform actions to adjust 338 the state of the custom resource such that the current state 332 matches the desired state 336. A request 301 may be received by API server 214 to change the current state 332 of custom resource 318 to desired state 336.

In the case that API request 301 is a create request for a custom resource. Reconciler 316 can act on the create event for the instance data for the custom resource. Reconciler 316 may create instance data for custom resources that the requested custom resource depends on. As an example, an edge node custom resource may depend on a virtual network custom resource, a virtual interface custom resource, and an IP address custom resource. In this example, when reconciler 316 receives a create event on an edge node custom resource, reconciler 316 can also create the custom resources that the edge node custom resource depends upon, e.g., a virtual network custom resource, a virtual interface custom resource, and an IP address custom resource. In some aspects, references and backreferences may be added to the instance data for a custom resource when an instance of a custom resource depends on one or more other instances of custom resources. For a first custom resource that is dependent upon a second custom resource, reconciler 316 can add, to the instance data for the first custom resource, a reference label identifying the second custom resource. Similarly, reconciler 316 can add, to the instance data of the second custom resource, a backreference to the dependent first custom resource. In some aspects, the reference or backreference may be a reference label or a backreference label, respectively. The reference label or backreference label may be identifier of a custom resource, and can include a prefix identifying whether the label is a reference label or a backreference label, and a unique instance identifier associated with the newly created instance of the custom resource being referred to. In some aspects, the reference or backreference label can also include a name of the custom resource being referred to. There may be restrictions on the amount of data that a reference label or backreference label can contain. In such cases, the instance identifier may be hashed to reduce the length of the instance identifier.

Figure 5B:
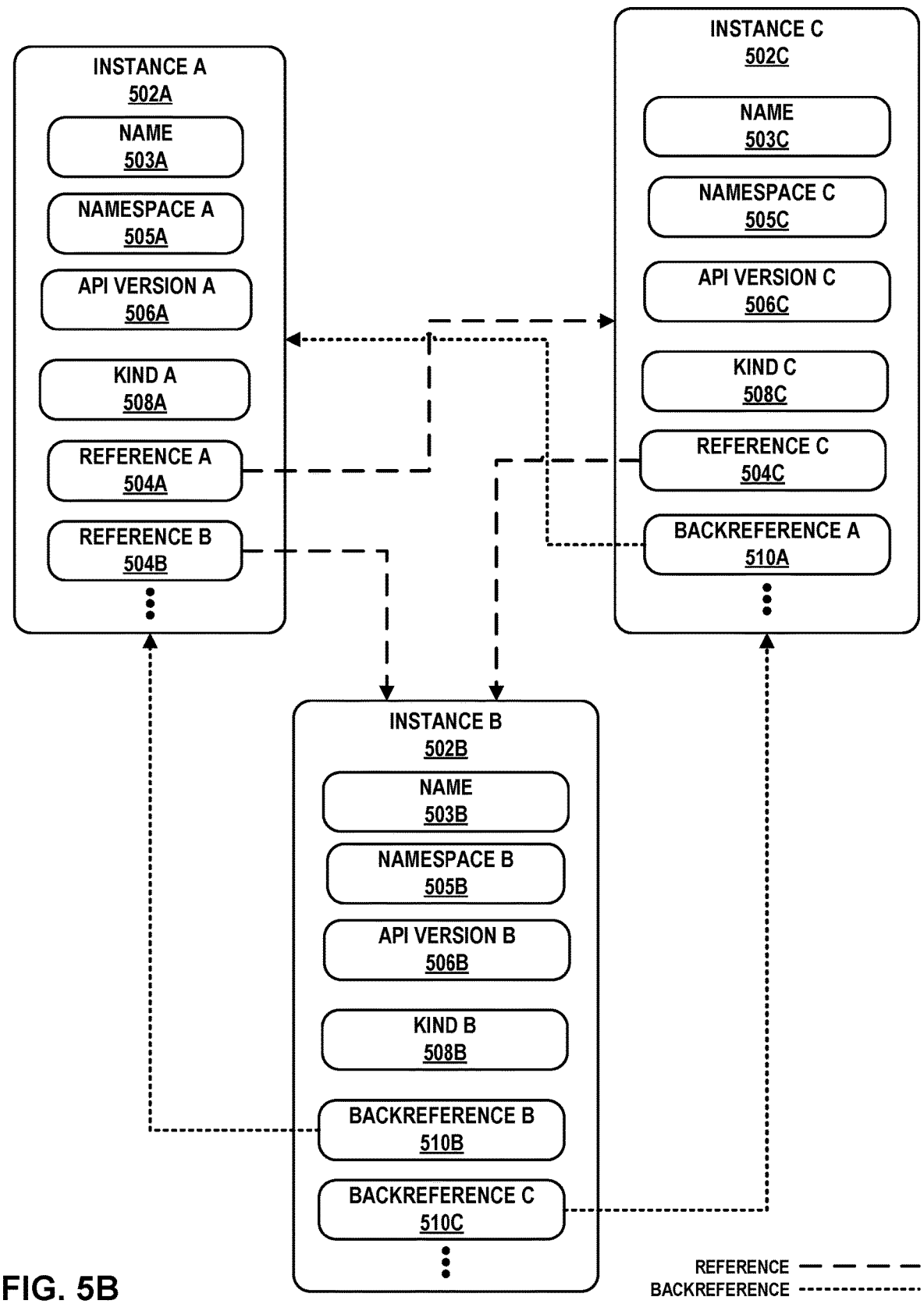

FIG. 5B is a conceptual view of an example of instance data for a custom resource that depends on two other custom resources. In the example illustrated in FIG. 5B, instance A 502A depends on instance B 502B and instance C 502C. Additionally, instance C 502C depends on instance B 502B. When instance A 502A is created, instance B 502B and instance C 502C may be created as they are depended on by instance A 502A. As part of creating instance data for instance A 502A, reconciler 316 (FIG. 3) may add appropriate reference and backreference labels that indicate the dependencies. For example, because instance A 502A is dependent on instances B 502B and C 502C, reconciler 316 can add reference 504A to instance C 502C and reference 504B to instance B 502B when the corresponding custom resources are created. Reconciler 316 can add backreference 510A to instance A 502A to instance C 502C to indicate that custom resource defined by instance A 502A depends on the custom resource defined by instance C502C. Similarly, reconciler 316 can add backreference 510B to instance data 502A to indicate that the custom resource defined by instance data 502A depends on the custom resource defined by instance data 502B. In this example, no custom resources are dependent on the custom resource defined by instance data 502A, therefore, reconciler 316 does not create any backreferences in instance data 502A.

As noted above, in the example illustrated in FIG. 5B, instance C 502C depends on instance B 502B. Thus, reconciler 316 can create a reference 504C to instance B 502B in instance C 502C. Additionally, reconciler 316 can create a backreference 510C to instance C 502C to indicate that instance C 502C is dependent in instance B 502B.

In the example shown in FIG. 5B, instance B 502B is not dependent on any other instances of a custom resource. Therefore, reconciler 316 does not create any references to other instances in the instance data for instance B 502B.

Once created, a custom resource can be protected from unintentional or erroneous deletion. In some aspects, webhooks that implement techniques described herein can be used to add functionality to a standard Kubernetes API server to prevent unintentional or erroneous deletion of the custom resource. An example of such an API server is described below with reference to FIG. 3. In some aspects, an extension API server (also referred to as an "aggregated API server") can include logic that implements techniques described herein to protect custom resources from unintentional or erroneous deletion. An example of such an extension API server is described below with reference to FIG. 4.

FIG. 3 is a block diagram illustrating an API server using webhooks to protect a custom resource from unintentional or erroneous deletion in accordance with one or more aspects of the present disclosure. In some aspects, API server 300 can be a default Kubernetes API server for a Kubernetes platform 240 (FIG. 2) such as API server 214. In some aspects, API server 300 can include API handler 302, authentication/authorization block 304, mutating admission block 306, object schema validation block 308, and validating admission block 310. API handler 302 can receive API request 301 and can perform initial validation of the API request 301. For example, API handler 302 can validate that API request 301 is a request handled by extension API server 300. Further, API handler 301 may validate parameters included with request 301.

Authentication/authorization block 304 can authenticate the identity of a user issuing request 301, and can determine if the user is authorized to make the request. If the identity of the user cannot be authenticated or if the user is not authorized to make the request, the request can be rejected.

Mutating admission block 306 can execute one or more webhooks that can modify instance data of an object such as a custom resource being created as part of a response to a create request. A webhook may be a callback that modifies or validates instance data for an object. In the example illustrated in FIG. 3, mutating admission block 306 has two webhooks 312A and 312B. Admission block 306 may have fewer webhooks or more webhooks 312 than those illustrated in FIG. 3.

Object schema validation block 308 can validate that the object schema for the object that is the subject of request 301 is a valid schema.

Validating admission block 310 can validate request 301 with respect to a custom resource object that is the subject of request 301. Like mutating admission block 306, validating admission block 310 can have one or more webhooks 312C-312N that perform validation functions with respect to request 310. In some aspects, one or more of the webhooks 312C-312N (in this example, webhook 312C) may include delete protection block 320A. Delete protection block 320 includes logic that protects instance data for custom resources that are depended upon by other custom resources from being deleted. In some aspects, if request 301 is a request to delete an instance of a custom resource, then delete protection block 320A can check to determine if the instance data for the instance of the custom resource includes a backreference to another custom resource. If a backreference is present, delete protection block 320A can indicate that validating admission block 310 should reject request 301. Validating admission block 310, in addition to rejecting request 301, can provide a reason for the rejection.

If request 301 passes the checks performed by any of API handler 302, authentication/authorization block 304, mutating admission block 306, object schema validation block 308, and validating admission block 310, the new state resulting from the request can be persisted to database 218 so that the cluster can be adjusted to reach the desired state.

FIG. 4 is a block diagram illustrating an extension API server in accordance with one or more aspects of the present disclosure. In some aspects, extension API server 400 can handle requests that the default API server 214 for a Kubernetes platform 240 (FIG. 2) does not handle. For example, extension API server 400 may handle requests related to a custom resource. Extension API server 300 can register with Kubernetes platform 240 to handle such requests. As an example, API request 301 may be a request associated with a custom resource, for example, to delete a custom resource. API server 214 can receive request 301 and determine that the request is not one that is handled by API server 214. API server 214 can "delegate" the API request to an extension API server that has registered to handle the request (e.g., extension API server 400).

In some aspects, extension API server 400 can include modules similar to those that may be included with default API server 214. For example, API server 300 can include API handler 402, authentication/authorization block 404, mutating admission block 406, object schema validation block 408, and validating admission block 410. API handler 402 can receive API request 301 from API server 214 and can perform initial validation of the API request 301. For example, API handler 402 can validate that API request 301 is a request handled by extension API server 400. Further, API handler 402 may validate parameters included with request 301.

Authentication/authorization block 404 can authenticate the identity of a user issuing request 301, and can determine if the user is authorized to make the request. If the identity of the user cannot be authenticated or if the user is not authorized to make the request, the request can be rejected.

Mutating admission block 406, can modify instance data of an object that is the subject of request 301.

Object schema validation block 408 can validate that the object schema for the object that is the subject of request 301 is a valid schema.

Validating admission block 410 can validate request 301 with respect to a custom resource object that is the subject of request 301. In some aspects, validating admission block 410 may include delete protection block 320B. Delete protection block 320B includes logic that protects instance data for custom resources that are depended upon by other custom resources from being unintentionally or erroneously deleted. In some aspects, if request 301 is a request to delete an instance of a custom resource, then delete protection block 320B can check to determine if the instance data for the instance of the custom resource includes a backreference. If a backreference is present, delete protection block 320B can indicate that validating admission block 410 should reject request 301. Validating admission block 410, in addition to rejecting request 301, can provide a reason for the rejection.

If request 301 passes the checks performed by any of API handler 402, authentication/authorization block 404, mutating admission block 406, object schema validation block 408, and validating admission block 410, the new state resulting from the request can be persisted to database 218 so that the cluster can be adjusted to reach the desired state.

FIGS. 6A-6E are example screen images showing various user interfaces related to the techniques described herein. The example screen images are presented in the context of an SDN in which a custom resource referred to as a "JespNode" represents an edge node in a cluster of the SDN. The edge node is dependent on a virtual interface, a virtual network, and an IP address. Thus, in this example, when a JespNode custom resource instance is created, a VirtualInterface custom resource instance for the MAC address and an InstanceIP custom resource instance for the IP address are created for the JespNode's management interface with the VirtualNetwork reference in the cluster. Also, the JespNode is provisioned and added to the cluster via the management port using the allocated IP address.

FIG. 6A is an example screen image 602 of a user interface showing a JespNode custom resource instance. Example screen image 602 includes labels 604 that show that the JespNode instance is dependent on three other custom resource instances, a VirtualInterface custom resource named "VirtualInterface_jesp_jespnode-example-ovsbr1," a VirtualNetwork custom resource named "Network_jesp_virtualnetwork-example," and an InstanceIP custom resource named "InstanceIP_jesp_jespnode-example-ovsbr1-iip." Unique instance identifiers for each of the referenced instances follows the prefix "reference.core.jesp.juniper.net." The JespNode custom resource instance shown in screen image 602 is not depended upon by any other custom resources, therefore there are no backreference labels shown in example screen image 602.

FIG. 6B is an example screen image 612 of a user interface showing a VirtualInterface custom resource instance. Example screen image 612 includes labels 614 that show that the VirtualInterface instance is depended upon by two other custom resource instances, an InstanceIP custom resource named "InstanceIP_jesp_jespnode-example-ovsbr1-iip," and the JespNode custom resource shown in FIG. 6A named "JespNode-jespnode-example." Unique instance identifiers for each of the backreferenced instances follows the prefix "backreference.core.jesp.juniper.net." The VirtualInterface custom resource instance shown in screen image 612 depends on a VirtualNetwork custom resource instance named "VirtualNetwork_jesp_virtualnetwork-example." A unique instance identifier for the referenced custom resource instance follows the prefix "reference.core.jesp.juniper.net."

FIG. 6C is an example screen image 622 of a user interface showing an InstanceIP custom resource instance. Example screen image 622 includes labels 624 that show that the InstanceIP instance is depended upon by the JespNode custom resource shown in FIG. 6A named "JespNodejespnode-example." Unique instance identifiers for each of the backreferences follows the prefix "backreference.core .jesp.juniper.net." The InstanceIp custom resource instance shown in screen image 622 depends on a VirtualNetwork custom resource instance named "VirtualNetwork_jesp_virtualnetwork-example." A unique instance identifier for the referenced custom resource instance follows the prefix "reference.core.jesp.juniper.net."

FIG. 6D is an example screen image 632 of a user interface showing a VirtualNetwork custom resource instance. Example screen image 632 includes labels 644 that show that the VirtualNetwork instance is depended upon by two other custom resource instances, the VirtualInterface custom resource shown in FIG. 6B named "VirtualInterface_jesp_jespnode-example-ovsbr1," and the InstanceIP custom resource shown in FIG. 6C named "InstanceIP_jesp_jespnode-example-ovsbr1-iip." Unique instance identifiers for each of the backreferences follows the prefix "backreference.core.jesp.juniper.net." The VirtualNetwork custom resource instance shown in screen image 632 depends on a SubNet custom resource instance named "Subnet_jesp_subnet-example." A unique instance identifier for the referenced custom resource instance follows the prefix "reference.core.jesp.juniper.net."

FIG. 6E is an example screen image 642 showing an attempt to delete the VirtualInterface custom resource instance prior to deletion of the JespNode custom resource instance. In portion 644 of example screen image 642, an administrator has issued a "kubectl command to attempt to delete the VirtualInterface custom resource instance named "virtualinterface.core.jesp.junipernet/jespnode-example-ovsbr1." The techniques described herein have been used to determine that the VirtualInterface custom resource has at least one backreference and is therefore depended upon by at least one other custom resource. Thus, deleting the VirtualInterface custom resource may cause anomalous behavior in the SDN should the deletion be allowed to proceed. Portion 644 of example screen image 642 shows that the deletion was prevented by giving the error message "Error from server (Forbidden): virtualinterfaces.core .jesp.juniper.net "jespnode-example-ovsbr1" is forbidden: back-reference(s) are present."

Figure 7A:
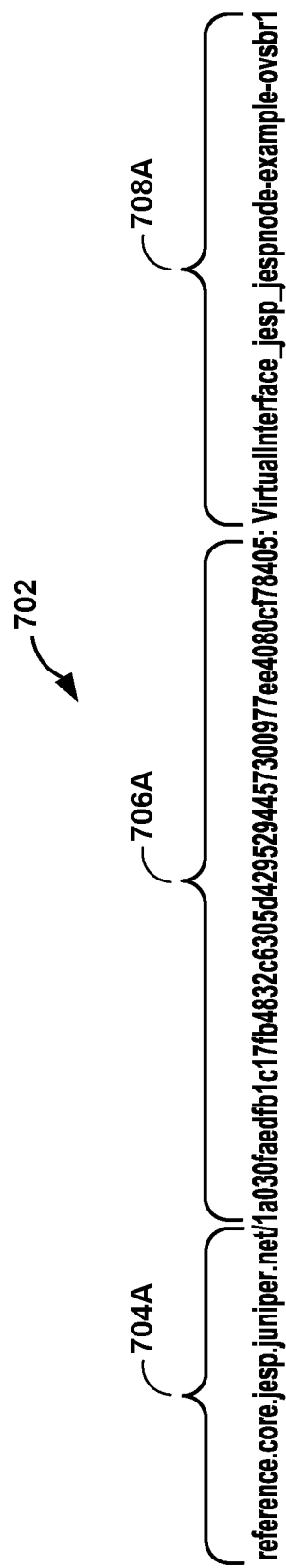
FIGS. 7A-7B are examples of a reference label and a backreference label in accordance with one or more aspects of the present disclosure.
Figure 7B:
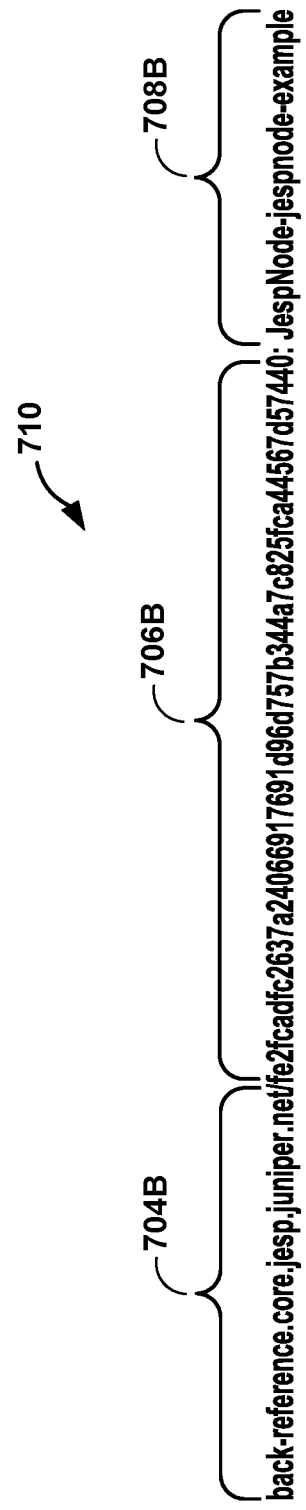

FIGS. 7A-7B are examples of a reference label and a backreference label in accordance with one or more aspects of the present disclosure. FIG. 7A shows an example reference label 702 taken from FIG. 6A. Example reference label 702 includes prefix 704A, instance identifier 706A and custom resource name 708A. Prefix 704A identifies the label as a reference label indicating that the custom resource depends on an instance of a custom resource identified by identifier 706A. In some aspects, the identifier may be a hashed version of the actual unique identifier of the custom resource instance. Hashing may be desirable if there are limits to the length of a label that would be exceeded if the full identifier were to be used in the label.

FIG. 7B shows an example backreference label 704 taken from FIG. 6B. Example backreference label includes prefix 704B, identifier 706B, and custom resource name 708B. Prefix 704B identifies the label as a backreference label indicating that the custom resource instance is depended upon by another custom resource instance identified by identifier 706B. As with identifier 706A, identifier 706B may be a hashed version of the actual unique identifier of the custom resource instance.

Figure 9:
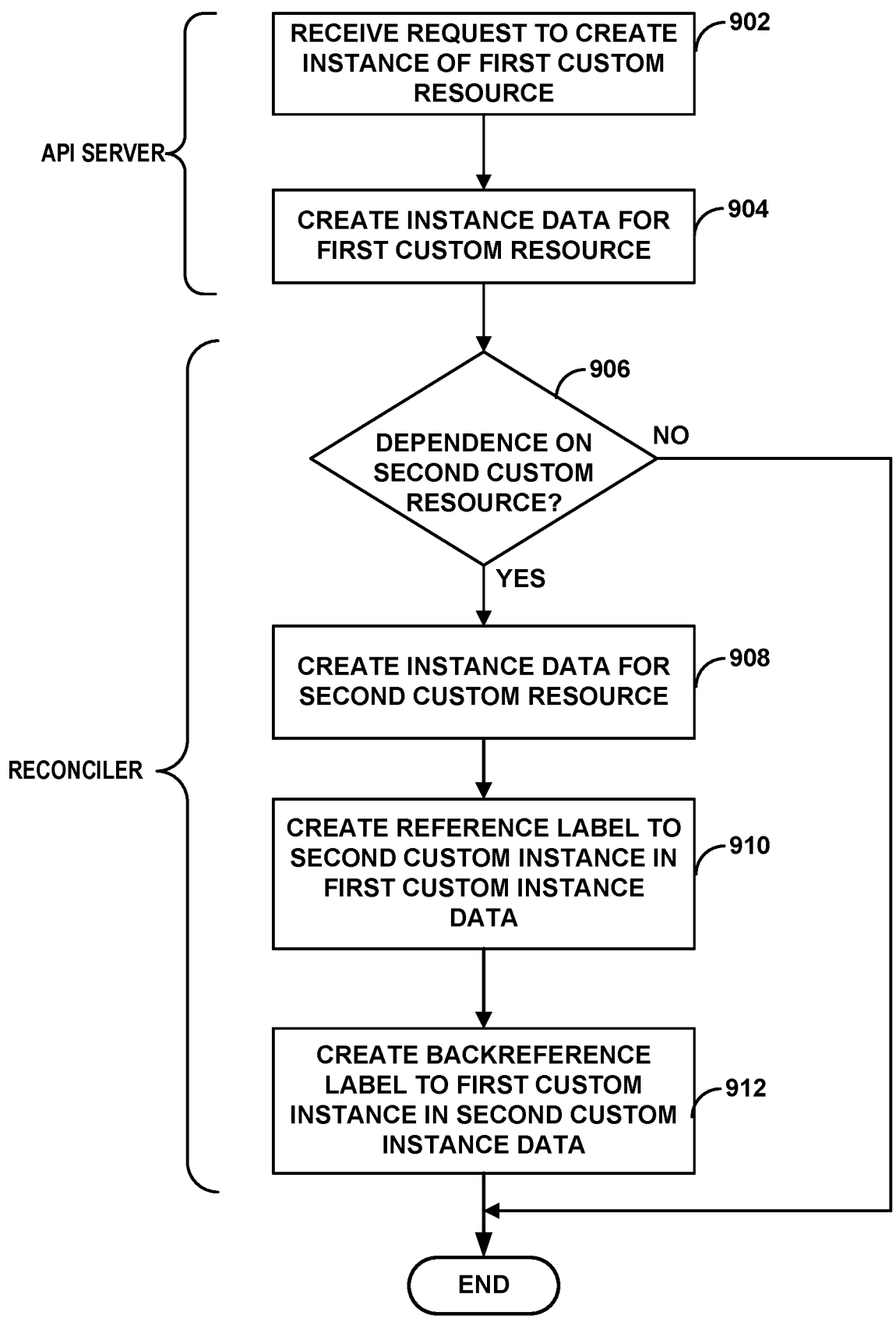
FIG. 9 is a flow chart illustrating operations of a method for creating custom resource instance data in accordance with one or more aspects of the present disclosure.

FIG. 9 is a flow chart illustrating operations of a method for creating custom resource instance data in accordance with one or more aspects of the present disclosure. The operations may be performed by an API server of a Kubernetes platform, for example, as part of an orchestrator in an SDN network. An API server can receive a request to create an instance of a custom first resource (902). The API server can create the first custom resource (904). The reconciler can determine if the first custom resource depends on a second custom resource (906). If the first custom resource does not depend on any other custom resources ("NO" branch of 906), the method ends. If the first custom resource does depend on a second custom resource ("YES" branch of 906), the reconciler can create instance data for the second custom resource (908). The reconciler can add a reference label to the second custom resource in the instance data for the first custom resource (910), thereby indicating the instance of the first custom resource depends on the second custom resource. The reconciler can add a backreference label to the first custom resource in the instance data of the second custom resource (912) thereby indicating that the second custom resource is depended upon by the first custom resource. Operations 906-912 may be repeated for each resource depended upon by the first custom resource.

Figure 10:
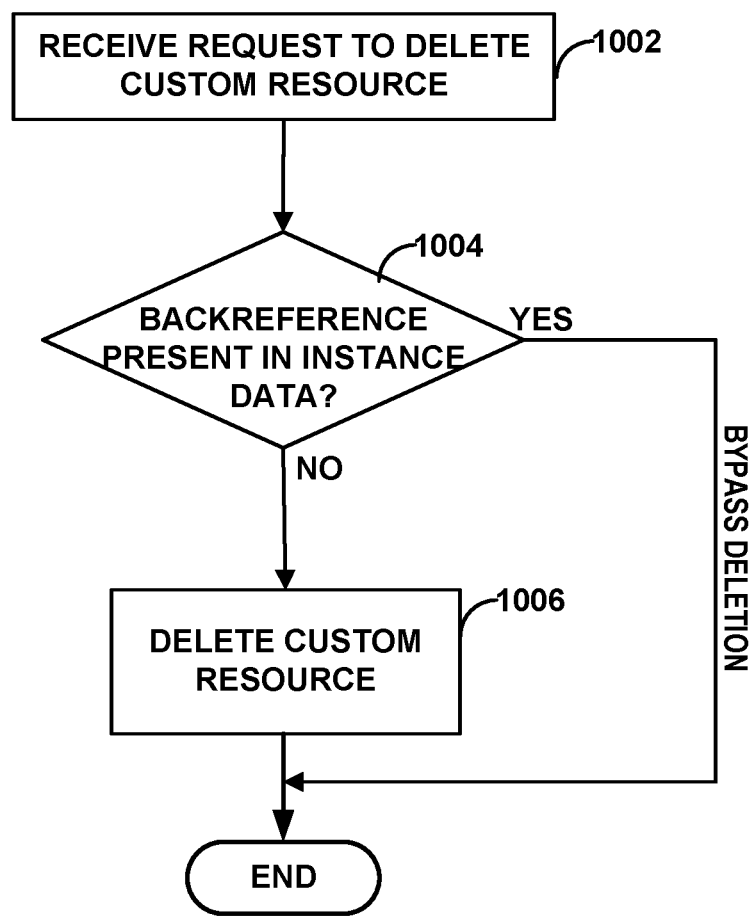
FIG. 10 is a flow chart illustrating a method for protecting Kubernetes resources from erroneous or unintentional deletion in accordance with one or more aspects of the present disclosure.

FIG. 10 is a flow chart illustrating a method for protecting Kubernetes resources from erroneous or unintentional deletion in accordance with one or more aspects of the present disclosure. The operations may be performed, for example, by a webhook of a standard API server of a Kubernetes platform or an extension API server. An API server may receive a request to delete an instance of a custom resource (1002). A validating admission block of an extension API server, or a webhook associated with a validating admission block of a standard API server may determine if the instance of the custom resource includes a backreference label, indicating that the instance of the custom resource is depended upon by an instance of another custom resource (1004). If there are no backreferences indicated in the instance data for the custom resource ("NO" branch of 1004), the instance of the custom resource is deleted (1006). In some aspects, instances of other custom resources that the custom resource depends upon may also be deleted. If there is at least one backreference indicating that the instance of the custom resource to be deleted is depended upon by an instance of another custom resource ("YES" branch of 1006), deletion of the instance is bypassed. In some aspects, an error indication may be provided indicating that the instance could not be deleted.

The above described techniques have been discussed in the context of an SDN. However, the techniques are not limited to SDNs, and can be implemented in many different environments that include a Kubernetes platform.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating

The invention claimed is:

1. A method comprising:
receiving, by an API server of a container orchestration platform managing a plurality of instances of custom resources including a first custom resource and a second custom resource, a request to create an instance of the first custom resource;
creating, by a reconciler and for an instance of the second custom resource, instance data including a backreference identifying the instance of the first custom resource, the backreference indicating the instance of the first custom resource is dependent on the instance of the second custom resource; and
based on determining that the instance data has the backreference identifying the instance of the first custom resource, bypassing deletion of the instance of the second custom resource.

2. The method of claim 1, further comprising:
based on determining that the instance data has the backreference identifying the instance of the first custom resource, outputting an indication of an error for the request to delete the instance of the second customer resource.

3. The method of claim 1, wherein based on determining that the instance data does not have a backreference identifying any custom resource, deleting the instance of the second custom resource.

4. The method of claim 1, further comprising inserting, into the backreference, a label prefix distinguishing the backreference from other types of references and an identifier of the instance of the first custom resource.

5. The method of claim 4, further comprising:
inserting a name into the backreference; and
hashing the identifier of the instance of the first custom resource to create a hash value of the identifier, wherein inserting the identifier of the instance of the first custom resource into the backreference comprises inserting the hash value into the backreference.

6. The method of claim 4, wherein determining that the instance data has the backreference identifying the instance of the first custom resource comprises determining whether the instance data includes the label prefix.

7. The method of claim 1, wherein the API server comprises an extension API server for handling requests identifying the second custom resource.

8. The method of claim 1, wherein determining that the instance data has the backreference identifying the instance of the first custom resource comprises determining, by a webhook associated with a validating admission block of the API server, that the instance data has the backreference identifying the instance of the first custom resource.

9. The method of claim 1, wherein the backreference of the instance of the second custom resource identifies the instance of the first custom resource to indicate dependence by the first custom resource on the second customer resource.

10. The method of claim 1, wherein the container orchestration platform comprises Kubernetes.

11. A container orchestration system configured to manage a plurality of instances of resources including a first custom resource and a second custom resource, the container orchestration system comprising:
an API server comprising processing circuitry configured to:
receive a request to create an instance of the first custom resource;
create, for an instance of the second custom resource, instance data including a backreference identifying the instance of the first custom resource, the backreference indicating the instance of the first custom resource is dependent on the instance of the second custom resource; and
based on a determination that the instance data has the backreference identifying the instance of the first custom resource, bypassing deletion of the instance of the second custom resource.

12. The container orchestration system of claim 11, wherein the API server is further configured to, based on a determination that the instance data has the backreference identifying the instance of the first custom resource, output an indication of an error for the request to delete the instance of the second customer resource.

13. The container orchestration system of claim 11, wherein the API server is further configured to, based on a determination that the instance data does not have a backreference identifying any custom resource, delete the instance of the second custom resource.

14. The container orchestration system of claim 11, wherein the processing circuitry is further configured to insert, into the backreference, a label prefix distinguishing the backreference from other types of references and an identifier of the instance of the first custom resource.

15. The container orchestration system of claim 14, wherein the processing circuitry is further configured to:
insert a name into the backreference; and
hash the identifier of the instance of the first custom resource to create a hash value of the identifier, wherein to insert the identifier of the instance of the first custom resource into the backreference comprises to insert the hash value into the backreference.

16. The container orchestration system of claim 14, wherein to determine that the instance data has the backreference identifying the instance of the first custom resource the processing circuitry is further configured to determine whether the instance data includes the label prefix.

17. The container orchestration system of claim 11, wherein the API server comprises an extension API server for handling requests identifying the second custom resource.

18. A non-transitory computer-readable storage medium having instructions stored thereon that cause one or more processors of a container orchestration platform managing a plurality of instances of resources including a first custom resource and a second custom resource to perform operations comprising:
receive a request to create an instance of the first custom resource;
create, for an instance of the second custom resource, instance data including a backreference identifying the instance of the first custom resource, the backreference indicating the instance of the first custom resource is dependent on the instance of the second custom resource; and
based on a determination that the instance data has the backreference identifying the instance of the first custom resource, bypass deletion of the instance of the second custom resource.

* * * * *